United States Patent
Ovadia et al.

(10) Patent No.: US 11,474,794 B2
(45) Date of Patent: Oct. 18, 2022

(54) GENERATING MOCK SERVICES BASED ON LOG ENTRIES

(71) Applicant: Red Hat, Inc., Raleigh, NC (US)

(72) Inventors: Ido Ovadia, Ra'anana (IL); Boaz Shuster, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/104,221

(22) Filed: Nov. 25, 2020

(65) Prior Publication Data

US 2022/0164168 A1 May 26, 2022

(51) Int. Cl.
*G06F 9/44* (2018.01)
*G06F 8/40* (2018.01)
*G06F 9/455* (2018.01)

(52) U.S. Cl.
CPC ............ *G06F 8/40* (2013.01); *G06F 9/45558* (2013.01)

(58) Field of Classification Search
CPC .............................. G06F 8/40; G06F 9/45558
USPC ................. 717/101–108, 124–127, 134–137
See application file for complete search history.

(56) References Cited

U.S. PATENT DOCUMENTS

| | | | |
|---|---|---|---|
| 7,496,658 B2 * | 2/2009 | Southam | H04L 43/50 702/121 |
| 9,836,388 B1 | 12/2017 | Moniz et al. | |
| 9,842,045 B2 | 12/2017 | Heorhiadi et al. | |
| 10,061,689 B1 | 8/2018 | Arguelles et al. | |
| 10,089,219 B1 * | 10/2018 | Bates | G06F 11/3688 |
| 10,459,833 B2 | 10/2019 | Thanabalan | |
| 10,592,402 B2 * | 3/2020 | Reeve | G06N 3/08 |
| 10,592,403 B2 * | 3/2020 | Reeve | G06F 11/3692 |
| 10,628,294 B2 * | 4/2020 | Datta | G06F 11/3696 |
| 10,963,370 B2 * | 3/2021 | Battaglia | G06F 11/3664 |
| 2009/0199047 A1 | 8/2009 | Vaitheeswaran et al. | |

OTHER PUBLICATIONS

SoapUI, "SOAP Mocking", Aug. 2020, Retrieved from https://web.archive.org/web/20200811042229/https://www.soapui.org/docs/soap-mocking/service-mocking-overview/, 32 pages. (Year: 2020).*

Savchenko et al., "Microservice Test Process: Design and Implementation", 2018, International Journal on Information Technologies & Security, pp. 13-24. (Year: 2018).*

(Continued)

*Primary Examiner* — Ted T. Vo
(74) *Attorney, Agent, or Firm* — Dority & Manning, P.A.

(57) ABSTRACT

Generating mock services based on log entries is disclosed herein. In some examples, a processor device of a computing device retrieves a plurality of log entries related to an error condition within a container platform. The processor device identifies a first pair of log entries that corresponds to a first request message received by a first service and a first response message sent by the first service, where the first response message corresponds to the error condition. The processor device next identifies a second pair of log entries that corresponds to a second request message sent by the first service to a second service and a second response message received by the first service from the second service. Based on the second pair of log entries, the processor device generates a mock service that simulates functionality of the second service for use in subsequent testing of the first service.

20 Claims, 8 Drawing Sheets

(56) References Cited

OTHER PUBLICATIONS

Kariuki, John, "Node.js Tests: Mocking HTTP Requests," Available online at https://scotch.io/tutorials/nodejs-tests-mocking-http-requests, Jul. 24, 2017, 8 pages.

Kelebeev, Maria, "A Primer on Big Data Testing," QA Consultants, Available online at https://qaconsultants.com/wp-content/uploads/2015/10/Primer-on-Big-Data-Testing.pdf, 2015, 24 pages.

Sayfan, Gigi, "Testing Complex Systems," Informa PLC, Available online at https://www.drdobbs.com/testing/testing-complex-systems/240168390, Jun. 10, 2014, 4 pages.

* cited by examiner

GENERATING MOCK SERVICES BASED ON LOG ENTRIES

BACKGROUND

Container platforms, such as Red Hat® OpenShift®, provide operating-system-level virtualization functionality in the form of isolated user-space instances referred to as "containers." A container platform may be implemented as a cluster of computing devices, or "nodes," that each provide containers within which applications are executed. The functionality of such applications can be exposed as "services" that may be accessible by client processes executing within the cluster of nodes and/or executing external to the cluster.

SUMMARY

The examples disclosed herein relate to generating mock services based on log entries. In this regard, in some examples, a processor device of a computing device retrieves a plurality of log entries related to an error condition within a container platform (e.g., in response to detecting the error condition). The processor device first identifies a first pair of log entries that corresponds to a first request message received by a first service and a first response message sent by the first service, where the first response message corresponds to the error condition. For example, the first response message may include an error code or other indication that the first service encountered an error or was otherwise unable to provide requested functionality. The processor device next identifies a second pair of log entries that corresponds to a second request message sent by the first service to a second service and a second response message received by the first service from the second service. After identifying the second pair of log entries, a mock service that simulates functionality of the second service is generated based on the second pair of log entries. For example, the mock service may be configured with a same API as the second service and may be configured to provide the second response message responsive to receiving the second request message. In this manner, the mock service can provide a lightweight substitute for the second service and can be used for testing or debugging the first service in a development environment.

In another example, a method is provided. The method comprises retrieving, by a processor device of a computing device, a plurality of log entries related to an error condition within a container platform. The method further comprises identifying a first pair of log entries among the plurality of log entries that corresponds to a first request message received by a first service of the container platform and a first response message sent by the first service and corresponding to the error condition. The method also comprises identifying a second pair of log entries based on the first pair of log entries, wherein the second pair of log entries corresponds to a second request message sent by the first service to a second service of the container platform and a second response message received by the first service from the second service. The method additionally comprises generating a mock service configured to provide the second response message responsive to receiving the second request message.

In another example, a computing device is provided. The computing device comprise a system memory and a processor device coupled to the system memory. The processor device is to retrieve a plurality of log entries related to an error condition within a container platform. The processor device is further to identify a first pair of log entries among the plurality of log entries that corresponds to a first request message received by a first service of the container platform and a first response message sent by the first service and corresponding to the error condition. The processor device is also to identify a second pair of log entries based on the first pair of log entries, wherein the second pair of log entries corresponds to a second request message sent by the first service to a second service of the container platform and a second response message received by the first service from the second service. The processor device is additionally to generate a mock service configured to provide the second response message responsive to receiving the second request message.

In another example, a computer program product is provided. The computer program product is stored on a non-transitory computer-readable medium, and includes computer-executable instructions to cause a processor device to retrieve a plurality of log entries related to an error condition within a container platform. The computer-executable instructions further cause the processor device to identify a first pair of log entries among the plurality of log entries that corresponds to a first request message received by a first service within the container platform and a first response message sent by the first service and corresponding to the error condition. The computer-executable instructions also cause the processor device to identify a second pair of log entries based on the first pair of log entries, wherein the second pair of log entries corresponds to a second request message sent by the first service to a second service within the container platform and a second response message received by the first service from the second service. The computer-executable instructions additionally cause the processor device to generate a mock service configured to provide the second response message responsive to receiving the second request message.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
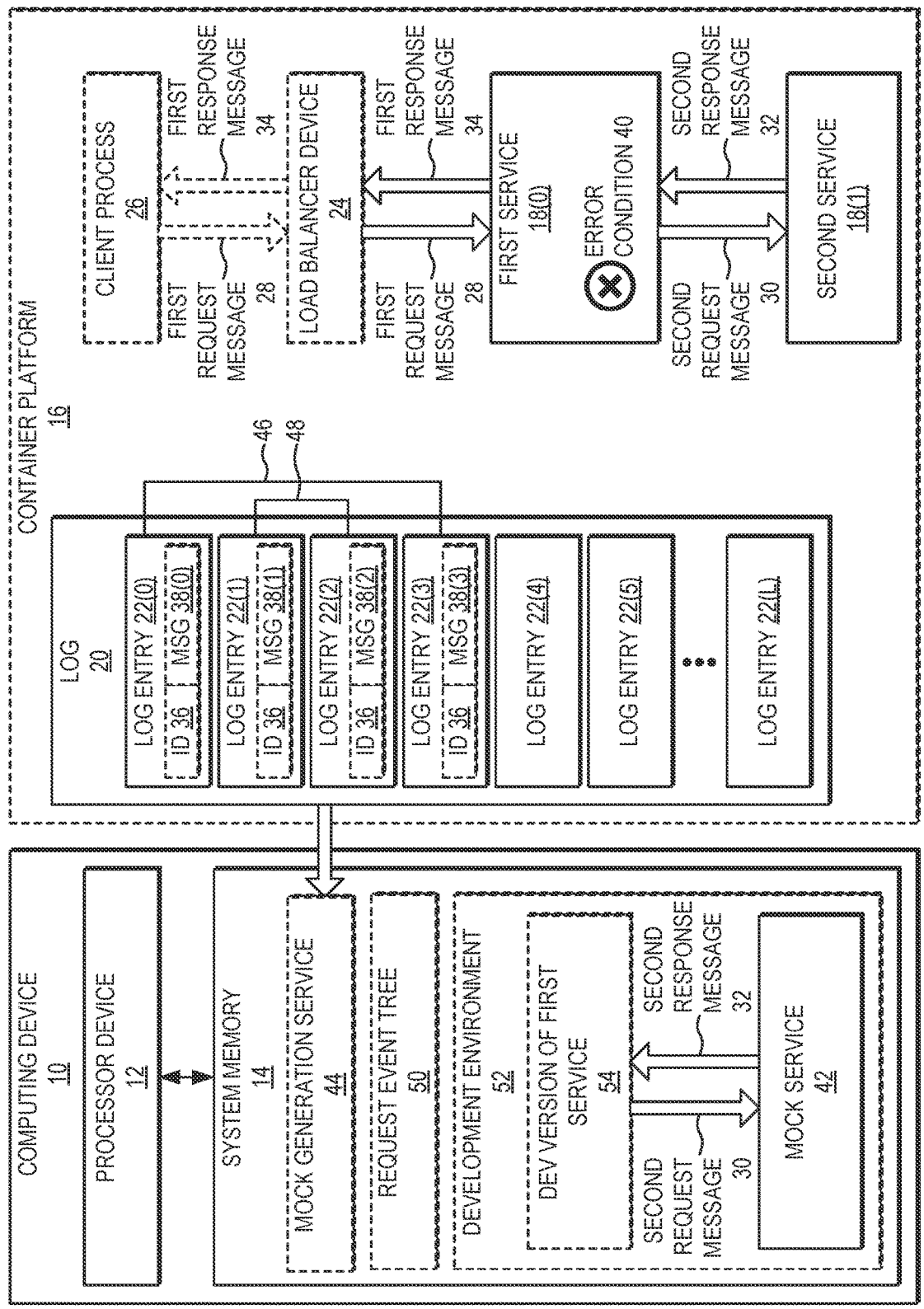
FIG. 1 is a block diagram of a computing device in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As noted above, container platforms, such as Red Hat® OpenShift®, provide operating-system-level virtualization functionality in the form of isolated user-space instances referred to as "containers." A container platform may be implemented using a cluster of computing devices, or "nodes," that are each configured to provide one or more containers, within each of which one or more applications are executed. The functionality of such an application can be exposed by the container platform as a "service" that is accessible to client processes executing within and/or external to the node in which the application underlying the service is hosted. A service is accessed via an interface, such as a Representation State Transfer (REST) application programming interface (API), through which a client process may send a request message indicating a desired operation and any required parameters to the service, and subsequently may receive a response message indicating a result of the requested operation from the service. Request messages and response messages may comprise Hypertext Transfer Protocol (HTTP) messages, such as GET and/or POST requests, as non-limiting examples. Accordingly, the term "service" and derivatives thereof are used herein to refer to a mechanism provided by a container platform for accessing application functionality using an API that allows the service to receive request messages from and send response messages to client processes and/or other services.

Container platforms conventionally provide one or more logs, in which system events generated by nodes (including, for example, request messages received by services and response messages sent by services) are recorded for monitoring and/or debugging purposes. Thus, a log may include a log entry that corresponds to a message (e.g, a request message or a response message), and that stores information such as a timestamp, message data indicating contents of the message, a message type (e.g., GET or POST), an identifier of a service or client process that sent the message, and/or an identifier of a service or client process to which the message is directed, as non-limiting examples. A container platform according to some examples may provide a single centralized log or may provide a plurality of logs.

A container platform may also provide a load balancer device that distributes network traffic from multiple client processes across nodes of the container platform, thereby improving overall performance of the container platform and ensuring that no single node is overworked relative to other nodes. The load balancer device in some examples may provide a transaction identifier that is included within multiple log entries that are associated with a single transaction or operation. For example, a first service may receive a request message from a client process and may subsequently send another request message to a second service in order to perform the operation requested by the client process. The first service may then receive a response message from the second service and send a response message back to the client process. Because all of the request messages and response messages sent by the first service and the second service are associated with the transaction requested by the client process, a load balancer may add a single unique transaction identifier to log entries corresponding to each of the request messages and response messages. In this manner, multiple log entries associated with a single transaction may be easily identified. It is to be understood that some examples may provide that a transaction identifier is provided by an entity other than the load balancer, such as another service or firewall plug-in, as non-limiting examples.

Because a container platform may include multiple nodes executing multiple services, testing applications that are implemented using container platforms may pose challenges due to the resources required to execute all nodes involved in providing the services that may need to be tested. One approach to testing an individual service of a container platform involves generating mock services with which the service being tested can interact. The term "mock service" and derivatives thereof are used herein to refer to a service that simulates the functionality of a target service (i.e., a service with which a service being tested interacts) by providing a same API as the target service, and sending a predetermined response message when the mock service receives an associated predetermined request message. Because a mock service may include only logic for receiving a request message, selecting an appropriate response message, and sending the selected response message, the mock service may require fewer computing resources to implement and execute than would be required to fully implement the target service. The service being tested can then be executed in a development environment in which it interacts with the mock service instead of the target service. However, generating a useful mock service requires identifying appropriate request messages and response messages to include in the mock service to reproduce a given testing scenario (e.g., to recreate circumstances in which a service being tested generates an error condition).

Accordingly, examples disclosed herein relate to generating mock services based on log entries. In some embodiments, a processor device of a computing device retrieves a plurality of log entries related to an error condition within a container platform (e.g., in response to detecting the error condition). The processor device first identifies a first pair of log entries that corresponds to a first request message received by a first service (e.g., from a client process) and a first response message sent by the first service (e.g., to the client process), where the first response message corresponds to the error condition. For example, the first response message may include an error code or other indication that the first service encountered an error or was otherwise unable to provide requested functionality.

The processor device next identifies a second pair of log entries that corresponds to a second request message sent by the first service to a second service and a second response message received by the first service from the second service. In some examples, the second pair of log entries may be identified by the processor device first determining a transaction identifier associated with the first pair of log entries, and then identifying the second pair of log entries based on the transaction identifier. The second pair of log entries may be one of multiple pairs of log entries identified based on the first pair of log entries. Some examples may provide that the second pair of log entries may be identified by the processor device building a request event tree, which is a data structure comprising a plurality of tree nodes corresponding to a plurality of services including the first service and the second service. Each parent tree node within the request event tree represents a requesting service (i.e., a service that sends a request message to another service corresponding to a child tree node of the parent tree node). Similarly, each child tree node within the request event tree represents a responding service (i.e., a service that sends a response message to another service corresponding to a parent tree node of the child tree node). The processor device in such examples may then identify the second pair of log entries based on the request event tree.

After identifying the second pair of log entries, the processor device may then generate a mock service that simulates functionality of the second service based on the second pair of log entries. For example, the mock service may be configured to provide a same API as the second service, and may be configured to provide the second response message responsive to receiving the second request message (as indicated by the second pair of log entries). In some examples, the processor device may configure a development environment to execute the mock service and a development version of the first service. The processor device may then perform testing of the development version of the first service using the mock service (i.e., in place of the second service) within the development environment.

To illustrate a computing device on which examples may be practiced, FIG. 1 is provided. In FIG. 1, a computing device 10 includes a processor device 12 communicatively coupled to a system memory 14. The computing device 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing device 10 may include more or fewer elements than illustrated in FIG. 1. For example, the processor device 12 may further include one or more functional units, instruction caches, unified caches, memory controllers, interconnect buses, and/or additional memory devices, caches, and/or controller circuits, which are omitted from FIG. 1 for the sake of clarity.

The processor device 12 is communicatively coupled (e.g., via a private or public network) to a container platform 16, which in some examples may comprise, e.g., Red Hat® OpenShift®. In the example of FIG. 1, the container platform 16 includes a first service 18(0) and a second service 18(1), and further includes a log 20 that stores a plurality of log entries 22(0)-22(L). The container platform 16 also includes a load balancer device 24 that is configured to receive requests from a client process 26 and distribute the requests to services such as the first service 18(0) and the second service 18(1).

Although not shown in FIG. 1 for the sake of clarity, it is to be understood that the first service 18(0), the second service 18(1), the log 20, and the load balancer device 24 may each be implemented on one or more nodes of a cluster of nodes (not shown) constituting the container platform 16. Thus, for example, the first service 18(0) and the second service 18(1) may be implemented by the same node or by different nodes, according to the needs of a particular implementation of the container platform 16. Likewise, the log 20 may represent a single log residing on one node or may represent multiple logs residing on multiple nodes within the cluster of nodes constituting the container platform 16. It is to be further understood that, although FIG. 1 shows the client process 26 as a process within the container platform 16, in some examples the client process 26 may be an executable process external to the container platform 16 that accesses the functionality of the container platform 16 via a private or public network (e.g., the internet). The container platform 16 in some examples may include other services in addition to the first service 18(0) and the second service 18(1) and may include other elements not shown in FIG. 1 for the sake of clarity. Finally, it is to be understood that the functionality of the applications (not shown) underlying each of the first service 18(0) and the second service 18(1) are attributed herein to the first service 18(0) and the second service 18(1) themselves for the sake of brevity.

In conventional operation, the load balancer device 24 receives a first request message 28 directed to the first service 18(0) from the client process 26. The first request message 28 comprises, e.g., an HTTP request message, and indicates a desired operation to be performed by the first service 18(0). The load balancer device 24 forwards the first request message 28 to the first service 18(0), which carries out the requested operation (i.e., using the application underlying the first service 18(0)). As part of performing the requested operation, the first service 18(0) sends a second request message 30 to the second service 18(1) to perform another operation or to provide data needed by the first service 18(0). The second service 18(1) then sends a second response message 32 to the first service 18(0). Upon completing its task, the first service 18(0) sends a first response message 34 back to the load balancer device 24, which relays the first response message 34 to the client process 26.

As the client process 26, the load balancer device 24, the first service 18(0), and the second service 18(1) interact, the log 20 is populated (e.g., by the load balancer device 24 or by one or more nodes hosting the first service 18(0) and the second service 18(1)) with the log entries 22(0)-22(L). In the example of FIG. 1, the log entries 22(0)-22(3) correspond to messages sent and received by the first service 18(0) and the second service 18(1). In particular, the log entry 22(0) corresponds to the first request message 28, the log entry 22(1) corresponds to the second request message 30, the log entry 22(2) corresponds to the second response message 32, and the log entry 22(3) corresponds to the first response message 34. The log entries 22(0)-22(3) of FIG. 1 are each tagged with a transaction identifier ("ID") 36, which is assigned by the load balancer device 24 to indicate that the log entries 22(0)-22(3) are associated with the same transaction. The log entries 22(0)-22(3) of FIG. 1 also contain corresponding message fields ("MSG") 38(0)-38(3), which store the contents of the request message or response message represented by the log entries 22(0)-22(3). It is to be understood that some examples may provide that the transaction identifier 36 is provided by an entity other than the load balancer device 24, such as another service or firewall plug-in, as non-limiting examples.

Circumstances may arise in which a service, such as the first service 18(0), encounters an error condition 40 during operation. The term "error condition" and derivatives thereof used herein refer to any indication of an incorrect or undesired result of operation of a service or application, such as a system exception, an application exception or error message, or an unexpected or incorrect result communicated in a response message from a service. Because of the complexity of the container platform 16 and the computing resources that may be required to operate the container platform 16, it may be impractical to reproduce the container platform 16 within a development environment to test or debug the first service 18(0). Moreover, reproducing the specific circumstances that led to the error condition 40 may be difficult.

In this regard, a mock service 42 is generated based on the log entries 22(0)-22(L) for use in testing the first service 18(0). The processor device 12 in the example of FIG. 1 executes a mock generation service 44 that retrieves the plurality of log entries 22(0)-22(L) related to the error condition 40 from the log 20 of the container platform 16. In some examples, the plurality of log entries 22(0)-22(L) may be retrieved responsive to the processor device 12 detecting the error condition 40 (e.g., by receiving an indication of the error condition 40 from the container platform 16). The mock generation service 44 identifies a first pair 46 of log entries (i.e., the log entries 22(0) and 22(3)) that corresponds to the first request message 28 and the first response message 34, respectively, where the first response message 34 corresponds to the error condition 40. For instance, the mock generation service 44 may identify the first pair 46 of log entries by determining that the message field 38(3) of the log entry 22(3) includes information from the first response message 34 identifying the error condition 40, and then determining that log entry 22(0) corresponds to the first request message 28.

After identifying the first pair 46 of log entries, the mock generation service 44 next seeks to identify any other services with which the first service 18(0) interacted in performing the operations that resulted in the error condition 40, so that mock services can be generated for those other services and used in testing the first service 18(0) in a development environment. Accordingly, the mock generation service 44 identifies a second pair 48 of log entries (i.e., the log entries 22(1) and 22(2)) that corresponds to the second request message 30 and the second response message 32, respectively. In some examples, the second pair 48 of log entries may be identified by the mock generation service 44 determining the transaction identifier 36 associated with the first pair 46 of log entries, and identifying the second pair 48 of log entries based on the transaction identifier 36. The second pair 48 of log entries in some examples may be one of a plurality of pairs of log entries that are identified based on the first pair 46 of log entries (i.e., in examples in which the first service 18(0) interacts with other services in addition to the second service 18(1)). Some examples may provide that the mock generation service 44 identifies the second pair 48 of log entries by building a request event tree 50 comprising a plurality of tree nodes indicating a hierarchical relationship between services such as the first service 18(0) and the second service 18(1), and identifying the second pair 48 of log entries based on the request event tree 50. The structure and use of the request event tree 50 are discussed below in greater detail with respect to FIG. 2.

Finally, a mock service 42 is generated to simulate the functionality of the second service 18(1) based on the second pair 48 of log entries. In particular, the mock service 42 simulates the functionality of the second service 18(1) by being configured to provide the second response message 32 (e.g., as indicated by the message field 38(2) of the log entry 22(2) corresponding to the second response message 32) in response to receiving the second request message 30 (e.g., as indicated by the message field 38(1) of the log entry 22(1) corresponding to the second request message 30). It is to be understood that the mock service 42 "receiving the second request message 30" refers to the mock service 42 receiving another request message having the same message content as the second request message 30, and not the mock service 42 receiving the same particular transmission of the second request message 30 received by the second service 18(1). Likewise, the mock service 42 "providing the second response message 32" refers to the mock service 42 sending another response message having the same message content as the second response message 32, and not the mock service 42 sending the same particular transmission of the second response message 32 sent by the second service 18(1). In some examples, the mock service 42 may be configured to incorporate other metrics or data from the log entries 22(1) and 22(2) when simulating the functionality of the second service 18(1). For instance, timestamp data provided by the log entries 22(1) and 22(2) may be used by the mock service 42 to incorporate an appropriate delay between receiving the second request message 30 and sending the second response message 32.

The mock service 42 may then be used for testing the first service 18(0). For example, the processor device 12 may configure a development environment 52 to execute the mock service 42 and a development version ("DEV VERSION") 54 of the first service 18(0). The development environment 52 may comprise, for example, software that provides mechanisms for programming and debugging the first service 18(0). The development version 54 of the first service 18(0) may comprise a local copy of the first service 18(0) that can be executed within the development environment 52. Testing of the development version 54 of the first service 18(0) may then be performed using the mock service 42 in place of the second service 18(1). In some examples, the mock service 42 may be generated automatically by the mock generation service 44.

Generating mock services as described above may also be performed for multiple sets of request messages sent by and corresponding response messages received from a single service (such as the second service 18(1)), and/or for generating multiple mock services for multiple services and/or multiple hierarchical levels of services. For example, if the first service 18(0) also interacts with a third service (not shown), the operations described above with respect to the second pair 48 of log entries 22(1) and 22(2) may be performed with respect to a third pair of log entries among the log entries 22(0)-22(L) to generate a mock service corresponding to the third service.

Figure 2:
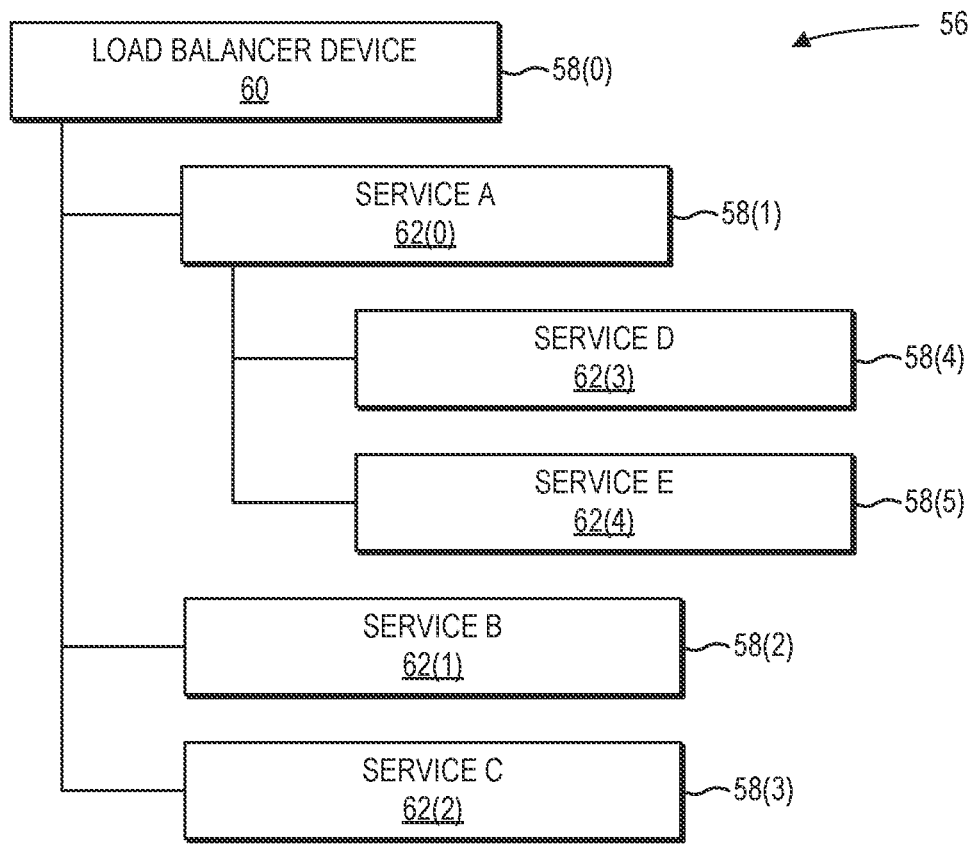
FIG. 2 is a block diagram illustrating an exemplary request event tree of FIG. 1 for identifying log entries for use in generating mock services, according to one example.

As discussed above with respect to FIG. 1, the process of identifying the second pair 48 of log entries may be accomplished by building the request event tree 50 representing hierarchical dependencies between services such as the first service 18(0) and the second service 18(1) of FIG. 1. In this regard, FIG. 2 illustrates an exemplary request event tree 56, which corresponds in functionality to the request event tree 50 of FIG. 1. The request event tree 56 in the example of FIG. 2 comprises a plurality of tree nodes 58(0)-58(5) and may comprise any data structure suitable for indicating hierarchical dependencies between the tree nodes 58(0)-58(5). In particular, each parent tree node in the request event tree 56 corresponds to a requesting service (i.e., a service that sends a request message to another service), while each child tree node in the request event tree 56 corresponds to a responding service (i.e., a service that sends a response message to another service). A tree node may be both a parent tree node and a child tree node relative to tree nodes representing other services. The request event tree 56 may be generated by the mock generation service 44 of FIG. 1 based on analysis of log entries such as the log entries 22(0)-22(L).

As seen in FIG. 2, a root tree node, tree node 58(0), of the request event tree 56 corresponds to a load balancer device 60 (such as the load balancer device 24 of FIG. 1). This is because the load balancer device 60 operates as a single entity through which request messages and response messages from client processes are received and routed to services. In the example of FIG. 2, Service A 62(0), Service B 62(1), and Service C 62(2) each receives request messages from, and provides response messages to, the load balancer device 60. Accordingly, the next level of tree nodes 58(1), 58(2), and 58(3) (corresponding to Service A 62(0), Service B 62(1), and Service C 62(2), respectively) are child tree nodes of the tree node 58(0) (corresponding to the load balancer device 60). Similarly, Service D 62(3) and Service E 62(4), which receive request messages from and provide response messages to Service A 62(0), are represented by tree nodes 58(4) and 58(5), respectively, which are child tree nodes of the tree node 58(1) corresponding to Service A 62(0).

Using the request event tree 56, services for which mock services need to be generated for testing can be identified. For instance, if Service A 62(0) is identified as the source of an error condition, the request event tree 56 can be used to determine that testing or debugging Service A 62(0) (represented by the tree node 58(1)) in a development environment may be accomplished more easily if mock services are generated for the services corresponding to child tree nodes of the tree node 58(1). As the child tree nodes of the tree node 58(1) are tree nodes 58(4) and 58(5) corresponding to Service D 62(3) and Service E 62(4), mock services therefore should be generated for Service D 62(3) and Service E 62(4) to facilitate testing of Service A 62(0).

Figure 3A:
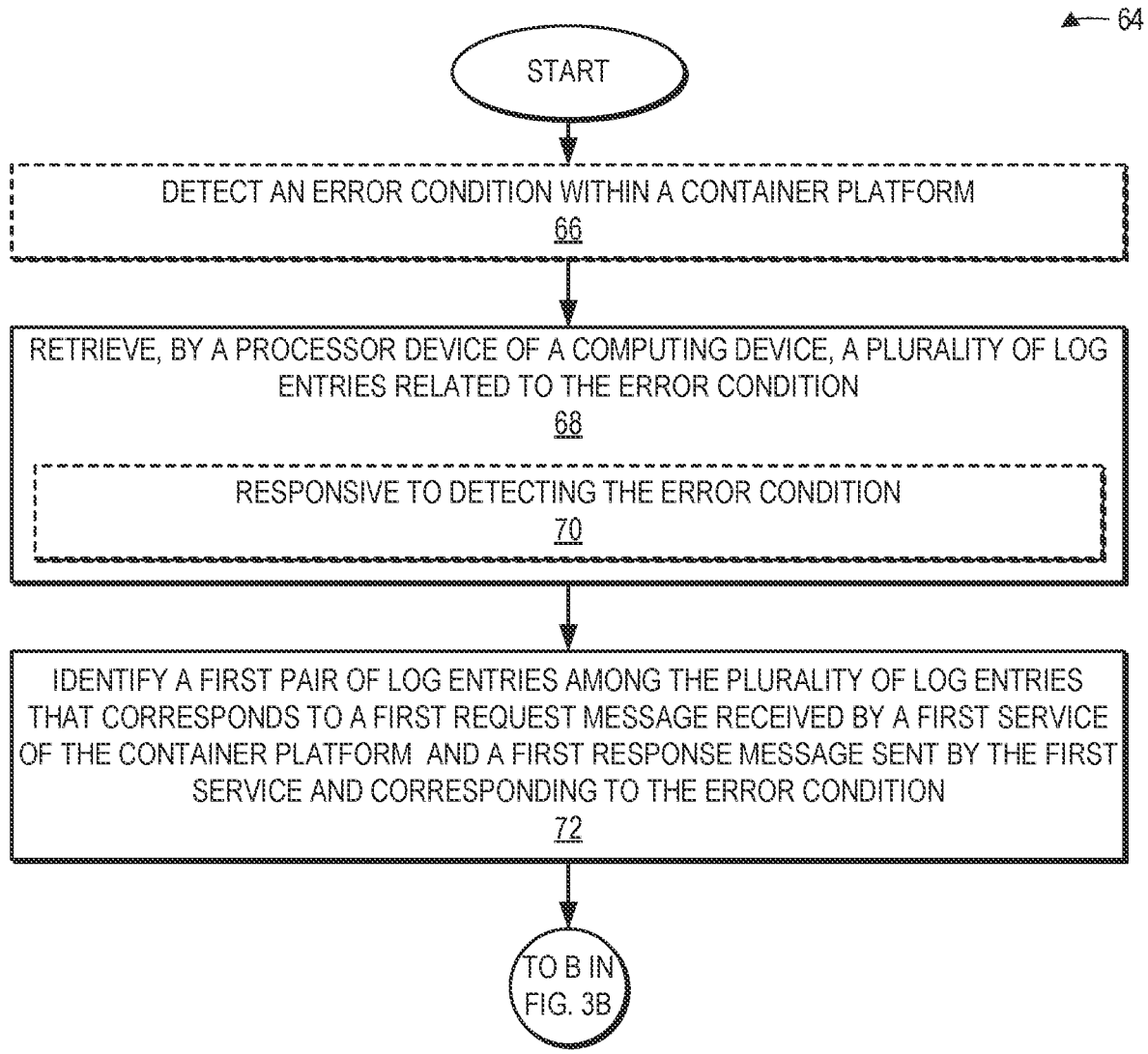
FIGS. 3A-3C are flowcharts illustrating exemplary operations for generating mock services based on log entries, according to one example.
Figure 3B:
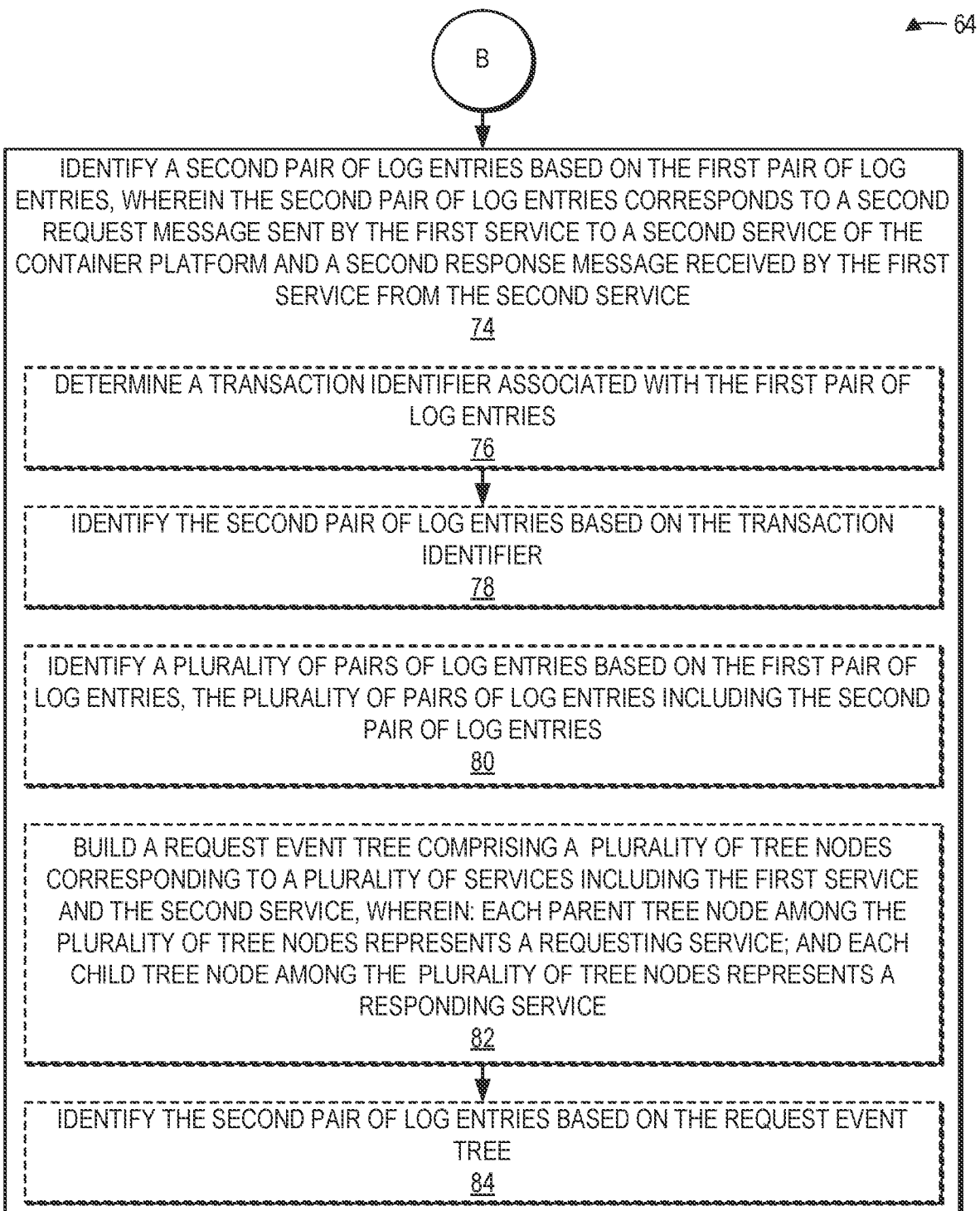
Figure 3C:
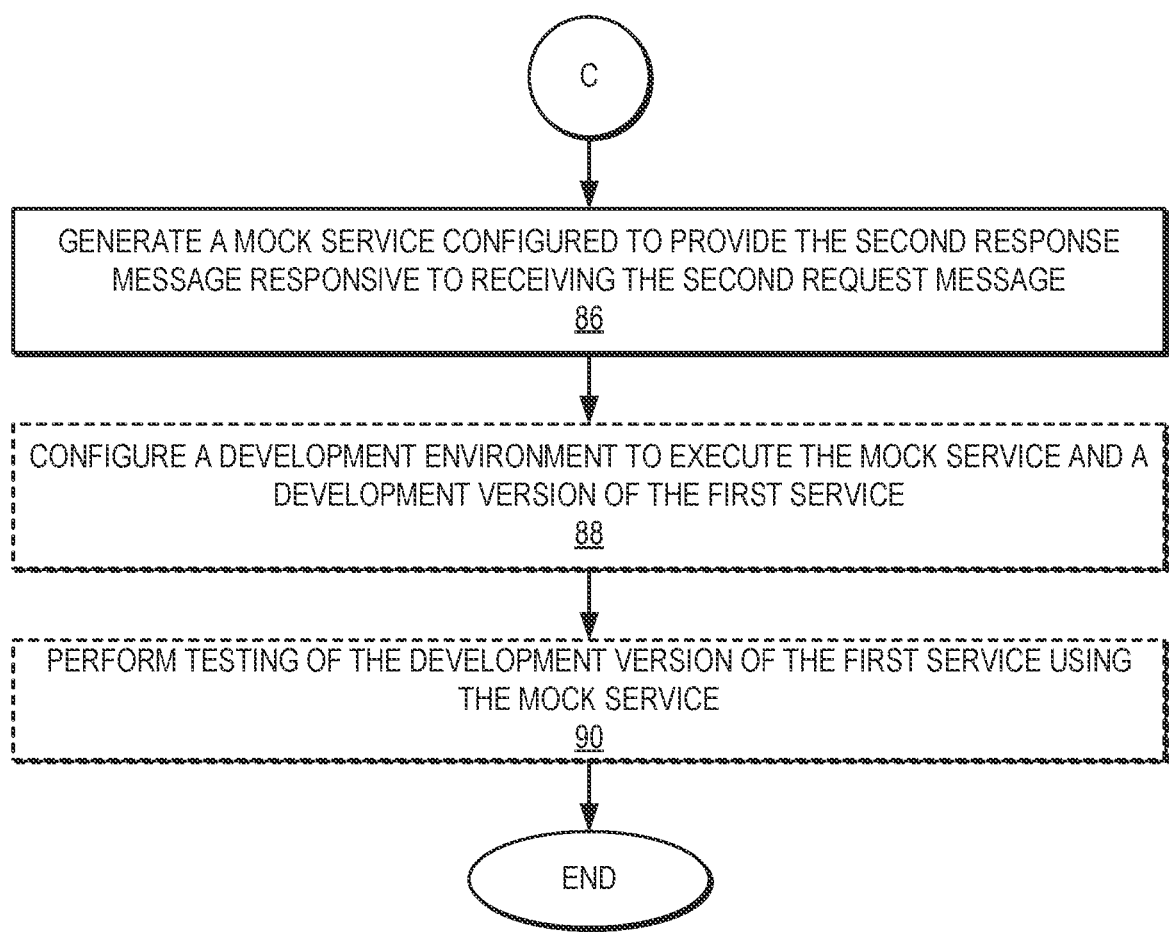

FIGS. 3A-3C provide a flowchart 64 illustrating exemplary operations for generating mock services based on log entries, according to one example. For the sake of clarity, elements of FIGS. 1 and 2 are referenced in describing FIGS. 3A-3C. In FIG. 3A, operations in some examples begin with the processor device 12 (e.g., executing the mock generation service 44) detecting the error condition 40 within the container platform 16 (block 66). The processor device 12 retrieves the plurality of log entries 22(0)-22(L) related to the error condition 40 (block 68). In some examples, the operations of block 68 for retrieving the plurality of log entries 22(0)-22(L) may be performed responsive to detecting the error condition 40 (block 70). The processor device 12 then identifies a first pair of log entries, such as the first pair 46 of FIG. 1, among the plurality of log entries 22(0)-22(L) that corresponds to the first request message 28 received by the first service 18(0) of the container platform 16 and the first response message 34 sent by the first service 18(0) and corresponding to the error condition 40 (block 72). Processing then resumes at block 74 of FIG. 3B.

Referring now to FIG. 3B, the processor device 12 next identifies a second pair of log entries, such as the second pair 48, based on the first pair 46 of log entries, wherein the second pair 48 of log entries corresponds to the second request message 30 sent by the first service 18(0) to the second service 18(1) of the container platform 16 and the second response message 32 received by the first service 18(0) from the second service 18(1) (block 74). Some examples may provide that the operations of block 74 for identifying the second pair 48 of log entries may comprise the processor device 12 first determining the transaction identifier 36 associated with the first pair 46 of log entries (block 76). The processor device 12 in such examples may then identify the second pair 48 of log entries based on the transaction identifier 36 (block 78). In some examples, the operations of block 74 for identifying the second pair 48 of log entries may comprise the processor device 12 identifying a plurality of pairs of log entries based on the first pair 46 of log entries, the plurality of pairs of log entries including the second pair 48 of log entries (block 80).

According to some examples, the operations of block 74 for identifying the second pair 48 of log entries may comprise the processor device 12 building a request event tree (such as the request event tree 56 of FIG. 2) comprising a plurality of tree nodes (e.g., the plurality of tree nodes 58(0)-58(5) of FIG. 2) corresponding to the plurality of services 18(0)-18(S) including the first service 18(0) and the second service 18(1), wherein each parent tree node among the plurality of tree nodes 58(0)-58(5) represents a requesting service, and each child tree node among the plurality of tree nodes 58(0)-58(5) represents a responding service (block 82). The processor device 12 may then identify the second pair 48 of log entries based on the request event tree 56 (block 84). Processing then continues at block 86 of FIG. 3C.

Turning now to FIG. 3C, the processor device 12 generates the mock service 42 configured to provide the second response message 32 responsive to receiving the second request message 30 (block 86). In some examples, the processor device 12 may further configure the development environment 52 to execute the mock service 42 and the development version 54 of the first service 18(0) (block 88). The processor device 12 may then performing testing of the development version 54 of the first service 18(0) using the mock service 42 (block 90).

Figure 4:
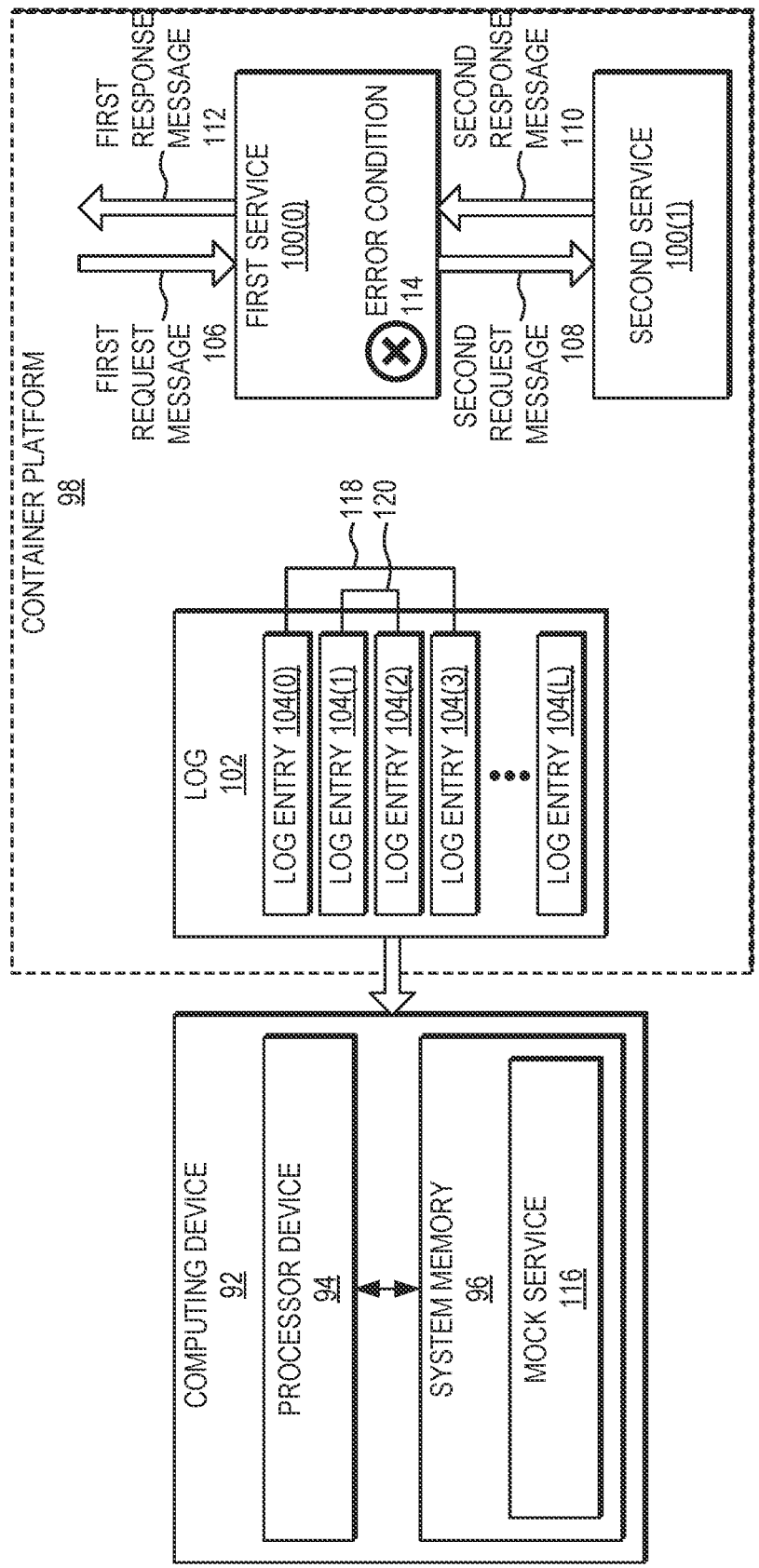
FIG. 4 is a simpler block diagram of the computing device of FIG. 1 for generating mock services based on log entries, according to one example.

FIG. 4 is a simpler block diagram of the computing device 10 of FIG. 1 for generating mock services based on log entries, according to one example. In FIG. 4, a computing device 92 includes a processor device 94 communicatively coupled to a system memory 96. The processor device 94 is communicatively coupled (e.g., via a public or private network) to a container platform 98, which in some examples may comprise, e.g., Red Hat® OpenShift®. In the example of FIG. 4, the container platform 98 includes a first service 100(0) and a second service 100(1), and further includes a log 102 that stores a plurality of log entries 104(0)-104(L). In the example of FIG. 4, the log entries 104(0)-104(3) correspond to messages sent and received by the first service 100(0) and the second service 100(1). In particular, the log entry 104(0) corresponds to the first request message 106, the log entry 104(1) corresponds to the second request message 108, the log entry 104(2) corresponds to the second response message 110, and the log entry 104(3) corresponds to the first response message 112.

Circumstances may arise in which a service, such as the first service 100(0), encounters an error condition 114 during operation. Accordingly, a mock service 116 is generated based on the log entries 104(0)-104(L) for use in testing the first service 100(0). The processor device 94 in FIG. 4 retrieves the plurality of log entries 104(0)-104(L) related to the error condition 114 from the log 102 of the container platform 98. The processor device 94 identifies a first pair 118 of log entries (i.e., the log entries 104(0) and 104(3)) that corresponds to the first request message 106 and the first response message 112, where the first response message 112 corresponds to the error condition 114. After identifying the first pair 118 of log entries, the processor device 94 identifies a second pair 120 of log entries (i.e., the log entries 104(1) and 104(2)) that corresponds to the second request message 108 and the second response message 110. Finally, a mock service 116 is generated to simulate the functionality of the second service 100(1) based on the second pair 120 of log entries. In particular, the mock service 116 simulates the functionality of the second service 100(1) by being configured to provide the second response message 110 in response to receiving the second request message 108.

Figure 5:
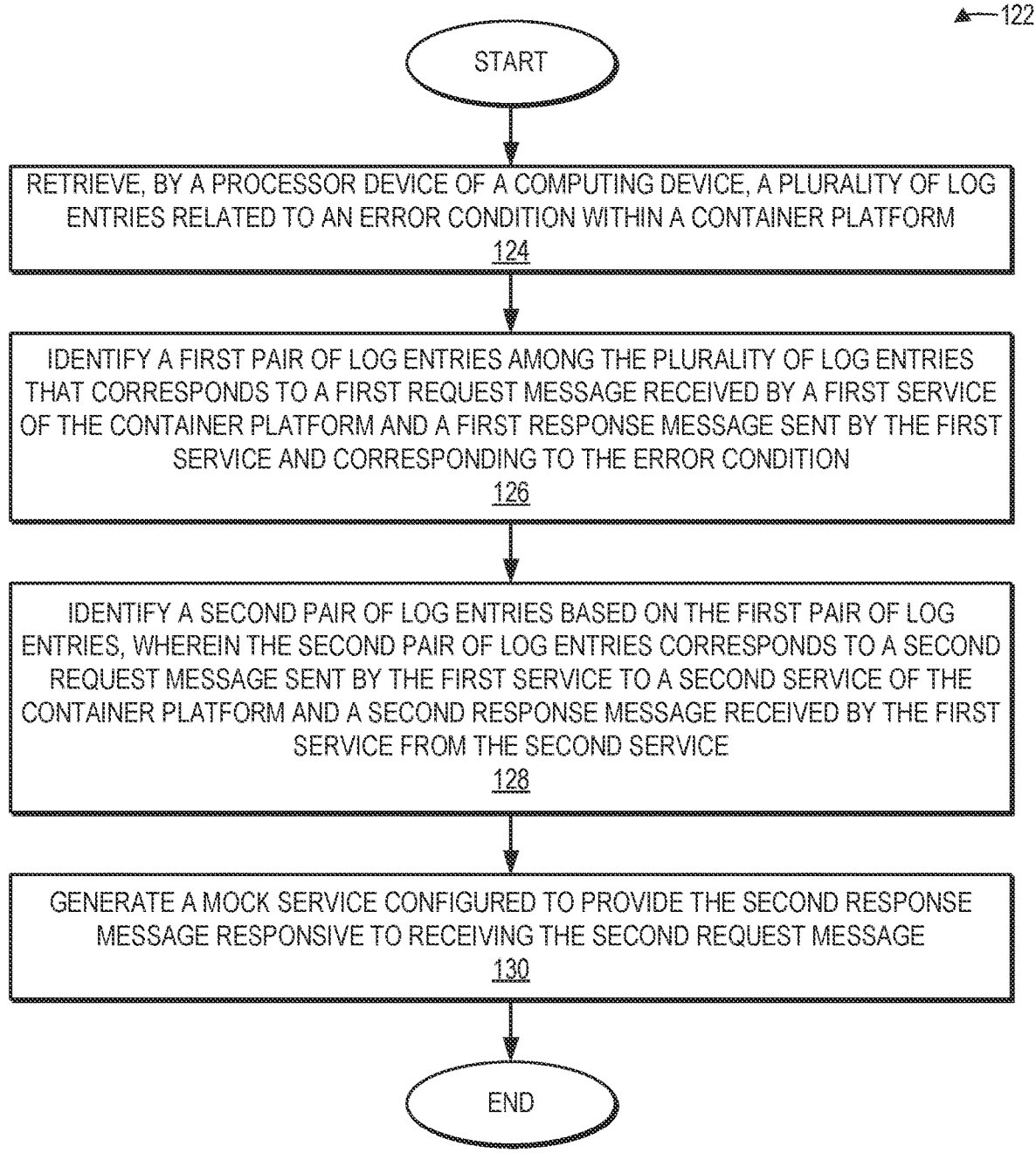
FIG. 5 is a flowchart of a simplified method for generating mock services based on log entries on the computing device of FIG. 4, according to one example.

FIG. 5 provides a flowchart 122 illustrating a simplified method for generating mock services based on log entries using the computing device 92 of FIG. 4, according to one example. Elements of FIG. 4 are referenced in describing FIG. 5 for the sake of clarity. Operations in FIG. 5 begin with the processor device 94 of the computing device 92 retrieving the plurality of log entries 104(0)-104(L) related to the error condition 114 within the container platform 98 (block 124). The processor device 12 identifies the first pair 118 of log entries among the plurality of log entries 104(0)-104(L) that corresponds to the first request message 106 received by the first service 100(0) of the container platform 98 and the first response message 112 sent by the first service 100(0) and corresponding to the error condition 114 (block 126). The processor device 94 next identifies a second pair 120 of log entries based on the first pair 118 of log entries, wherein the second pair 120 of log entries corresponds to the second request message 108 sent by the first service 100(0) to the second service 100(1) of the container platform 98 and the second response message 110 received by the first service 100(0) from the second service 100(1) (block 128). Finally, the processor device 94 generates the mock service 116 configured to provide the second response message 110 responsive to receiving the second request message 108 (block 130).

Figure 6:
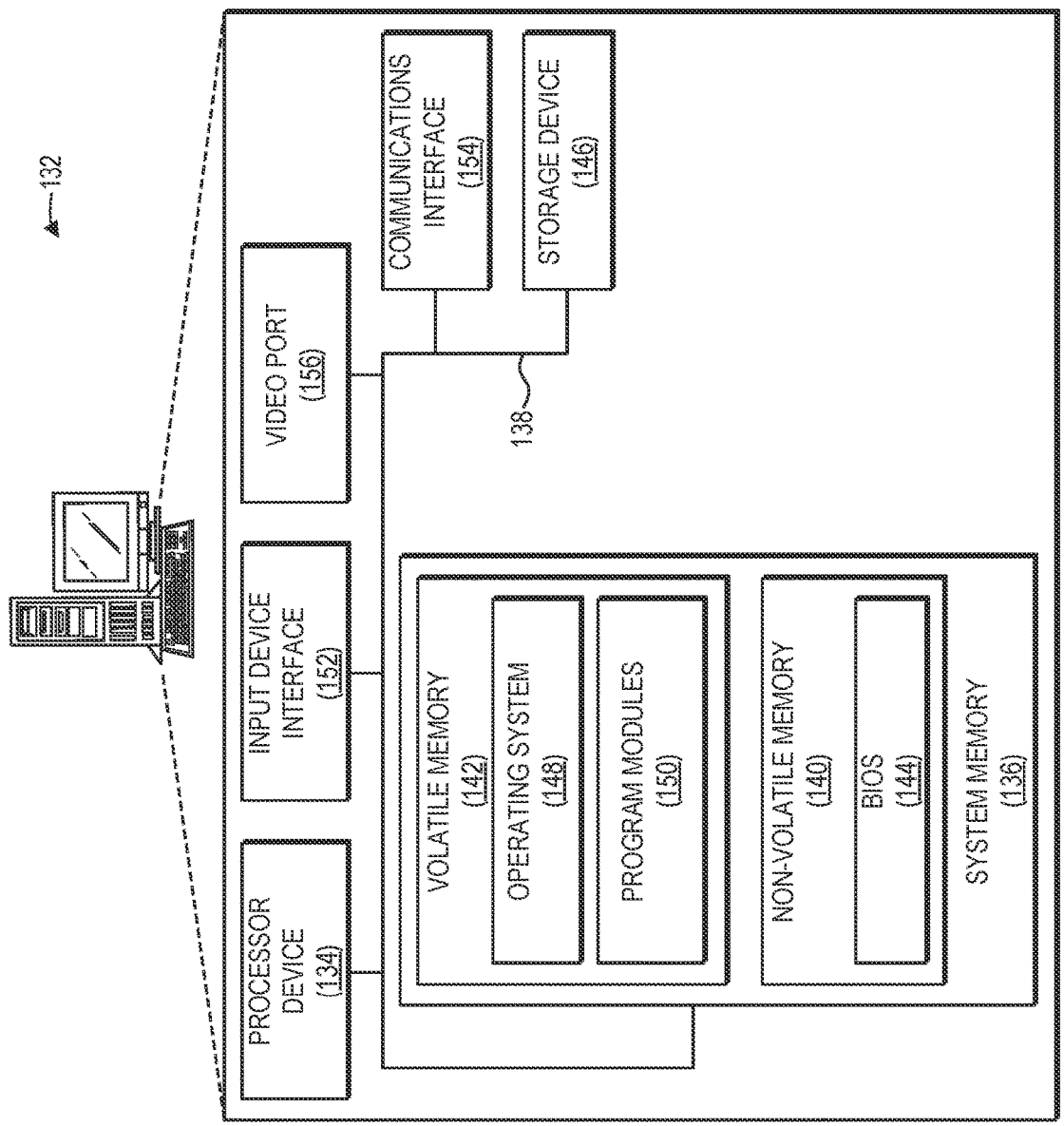
FIG. 6 is a block diagram of a computing device suitable for implementing examples, according to one example.

FIG. 6 is a block diagram of a computing device 132, such as the computing device 10 of FIG. 1 or the computing device 92 of FIG. 4, suitable for implementing examples according to one example. The computing device 132 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 132 includes a processor device 134, a system memory 136, and a system bus 138. The system bus 138 provides an interface for system components including, but not limited to, the system memory 136 and the processor device 134. The processor device 134 can be any commercially available or proprietary processor.

The system bus 138 may be any of several types of bus structures that may further interconnect to a memory bus (with or without a memory controller), a peripheral bus, and/or a local bus using any of a variety of commercially available bus architectures. The system memory 136 may include non-volatile memory 140 (e.g., read-only memory (ROM), erasable programmable ROM (EPROM), electrically EPROM (EEPROM), etc.), and volatile memory 142 (e.g., random access memory (RAM)). A basic input/output system (BIOS) 144 may be stored in the non-volatile memory 140 and can include the basic routines that help to transfer information among elements within the computing device 132. The volatile memory 142 may also include a high-speed RAM, such as static RAM, for caching data.

The computing device 132 may further include or be coupled to a non-transitory computer-readable storage medium such as a storage device 146, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 146 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 146 and in the volatile memory 142, including an operating system 148 and one or more program modules 150 which may implement the functionality described herein in whole or in part. It is to be appreciated that the examples can be implemented with various commercially available operating systems 148 or combinations of operating systems 148. All or a portion of the examples may be implemented as a computer program product stored on a transitory or non-transitory computer-usable or computer-readable storage medium, such as the storage device 146, which includes complex programming instructions, such as complex computer-readable program code, to cause the processor device 134 to carry out the steps described herein. Thus, the computer-readable program code can comprise software instructions for implementing the functionality of the examples described herein when executed on the processor device 134. The processor device 134 may serve as a controller, or control system, for the computing device 132 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 134 through an input device interface 152 that is coupled to the system bus 138 but can be connected by other interfaces, such as a parallel port, an Institute of Electrical and Electronic Engineers (IEEE) 13134 serial port, a Universal Serial Bus (USB) port, an infrared (IR) interface, and the like.

The computing device 132 may also include a communications interface 154 suitable for communicating with a network as appropriate or desired. The computing device 132 may also include a video port 156 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
retrieving, by a processor device of a computing device, a plurality of log entries related to an error condition within a container platform;
identifying a first pair of log entries among the plurality of log entries that corresponds to a first request message received by a first service of the container platform and a first response message sent by the first service and corresponding to the error condition;

identifying a second pair of log entries, wherein the second pair of log entries corresponds to a second request message sent by the first service to a second service of the container platform and a second response message received by the first service from the second service; and generating a mock service configured to provide the second response message responsive to receiving the second request message.

2. The method of claim 1, further comprising:

configuring a development environment to execute the mock service and a development version of the first service; and performing testing of the development version of the first service using the mock service.

3. The method of claim 1, wherein identifying the second pair of log entries comprises:

determining a transaction identifier associated with the first pair of log entries; and identifying the second pair of log entries based on the transaction identifier.

4. The method of claim 3, wherein the transaction identifier is assigned to the first pair of log entries and the second pair of log entries by a load balancer device.

5. The method of claim 1, further comprising, prior to retrieving the plurality of log entries related to the error condition, detecting the error condition within the container platform;

wherein retrieving the plurality of log entries related to the error condition is responsive to detecting the error condition.

6. The method of claim 1, wherein:

identifying the second pair of log entries comprises identifying a plurality of pairs of log entries based on the first pair of log entries; and the plurality of pairs of log entries includes the second pair of log entries.

7. The method of claim 1, wherein identifying the second pair of log entries comprises:

building a request event tree comprising a plurality of tree nodes corresponding to a plurality of services including the first service and the second service, wherein:

each parent tree node among the plurality of tree nodes represents a requesting service; and each child tree node among the plurality of tree nodes represents a responding service; and identifying the second pair of log entries based on the request event tree.

8. A computing device, comprising:

a system memory; and a processor device coupled to the system memory to:

retrieve a plurality of log entries related to an error condition within a container platform;

identify a first pair of log entries among the plurality of log entries that corresponds to a first request message received by a first service of the container platform and a first response message sent by the first service and corresponding to the error condition;

identify a second pair of log entries based on the first pair of log entries, wherein the second pair of log entries corresponds to a second request message sent by the first service to a second service of the container platform and a second response message received by the first service from the second service; and generate a mock service configured to provide the second response message responsive to receiving the second request message.

9. The computing device of claim 8, wherein the processor device is further to:

configure a development environment to execute the mock service and a development version of the first service; and perform testing of the development version of the first service using the mock service.

10. The computing device of claim 8, wherein to identify the second pair of log entries is to:

determine a transaction identifier associated with the first pair of log entries; and identify the second pair of log entries based on the transaction identifier.

11. The computing device of claim 10, wherein the transaction identifier is assigned to the first pair of log entries and the second pair of log entries by a load balancer device.

12. The computing device of claim 8, wherein the processor device is further to, prior to retrieving the plurality of log entries related to the error condition, detect the error condition within the container platform;

wherein to retrieve the plurality of log entries related to the error condition is to retrieve the plurality of log entries related to the error condition responsive to detecting the error condition.

13. The computing device of claim 8, wherein:

to identify the second pair of log entries is to identify a plurality of pairs of log entries based on the first pair of log entries; and the plurality of pairs of log entries includes the second pair of log entries.

14. The computing device of claim 8, wherein to identify the second pair of log entries is to:

build a request event tree comprising a plurality of tree nodes corresponding to a plurality of services including the first service and the second service, wherein:

each parent tree node among the plurality of tree nodes represents a requesting service; and each child tree node among the plurality of tree nodes represents a responding service; and identify the second pair of log entries based on the request event tree.

15. A non-transitory computer-readable medium having stored thereon computer-executable instructions which, when executed by a processor device, cause the processor device to:

retrieve a plurality of log entries related to an error condition within a container platform;

identify a first pair of log entries among the plurality of log entries that corresponds to a first request message received by a first service within the container platform and a first response message sent by the first service and corresponding to the error condition;

identify a second pair of log entries based on the first pair of log entries, wherein the second pair of log entries corresponds to a second request message sent by the first service to a second service within the container platform and a second response message received by the first service from the second service; and generate a mock service configured to provide the second response message responsive to receiving the second request message.

16. The non-transitory computer-readable medium of claim 15, wherein the computer-executable instructions further cause the processor device to:

configure a development environment to execute the mock service and a development version of the first service; and perform testing of the development version of the first service using the mock service.

17. The non-transitory computer-readable medium of claim 15, wherein the computer-executable instructions cause the processor device to identify the second pair of log entries by causing the processor device to:

determine a transaction identifier associated with the first pair of log entries; and identify the second pair of log entries based on the transaction identifier.

18. The non-transitory computer-readable medium of claim 15, wherein the computer-executable instructions further cause the processor device to, prior to retrieving the plurality of log entries related to the error condition, detect the error condition;

wherein to retrieve the plurality of log entries related to the error condition is to retrieve the plurality of log entries related to the error condition responsive to detecting the error condition.

19. The non-transitory computer-readable medium of claim 15, wherein:

to identify the second pair of log entries is to identify a plurality of pairs of log entries based on the first pair of log entries; and the plurality of pairs of log entries includes the second pair of log entries.

20. The non-transitory computer-readable medium of claim 15, wherein to identify the second pair of log entries is to:

build a request event tree comprising a plurality of tree nodes corresponding to a plurality of services including the first service and the second service, wherein:

each parent tree node among the plurality of tree nodes represents a requesting service; and each child tree node among the plurality of tree nodes represents a responding service; and identify the second pair of log entries based on the request event tree.

* * * * *